July 11, 1939.  F. R. ELLIOTT  2,165,360
SUPERCHARGER SYSTEM FOR MOTOR VEHICLES
Filed Jan. 10, 1938   2 Sheets-Sheet 1
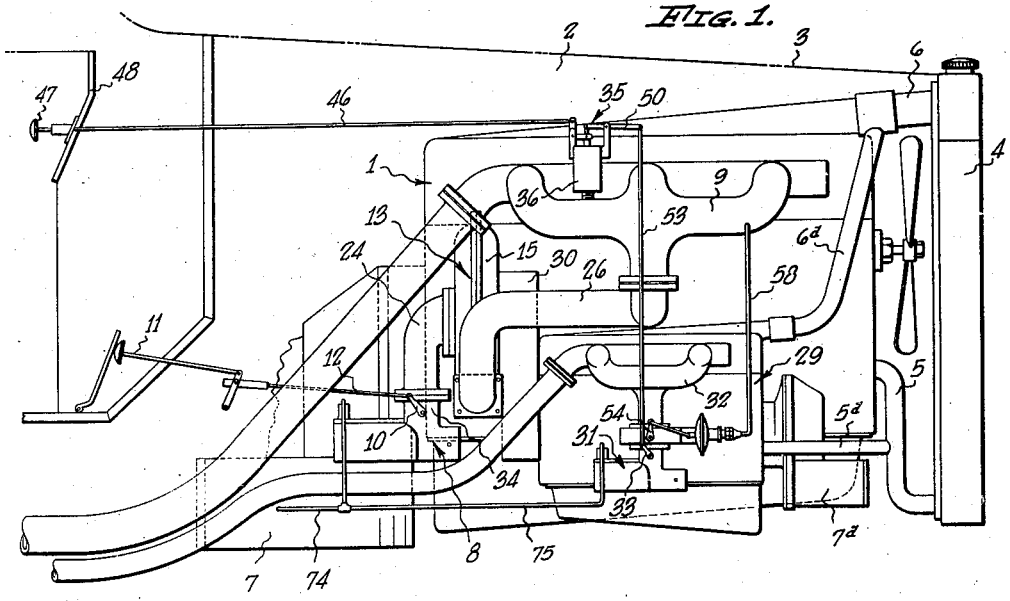
FIG. 1.
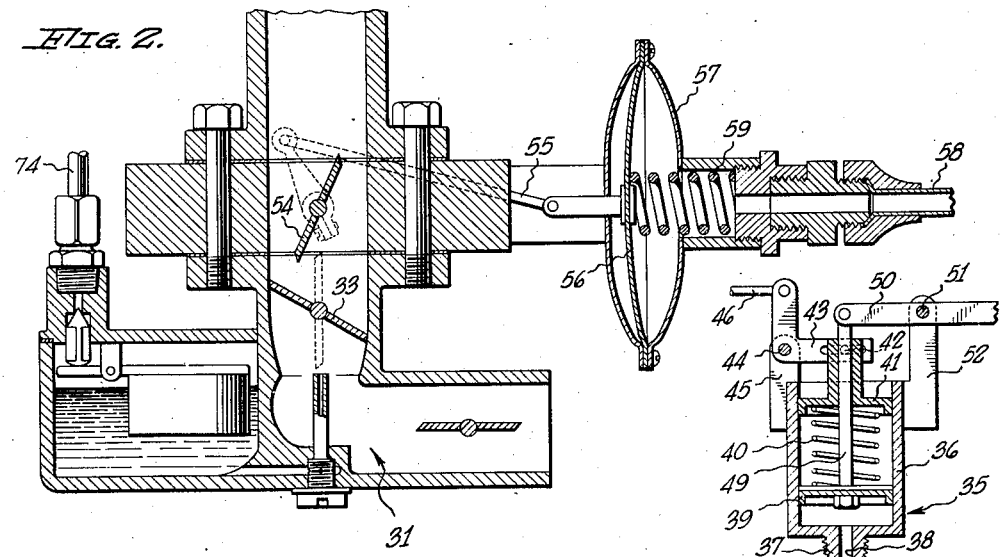
FIG. 2.
FIG. 3.
INVENTOR
FRANK R. ELLIOTT
BY
*Harold W. Mattingly*
ATTORNEY July 11, 1939.  F. R. ELLIOTT  2,165,360
SUPERCHARGER SYSTEM FOR MOTOR VEHICLES
Filed Jan. 10, 1938  2 Sheets-Sheet 2
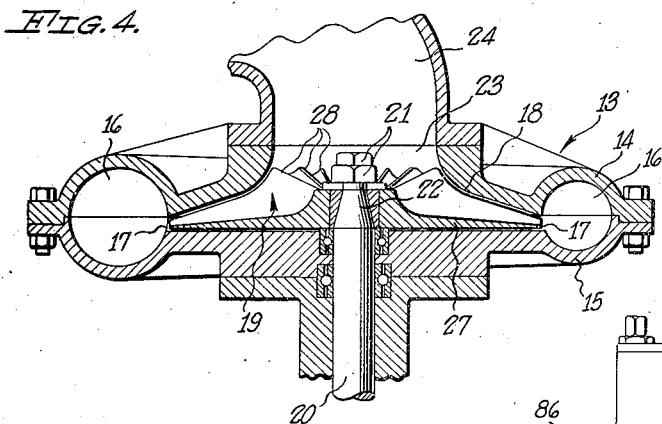
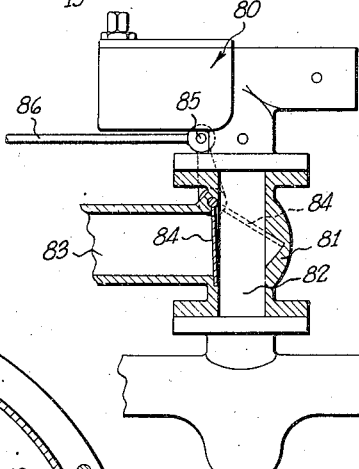
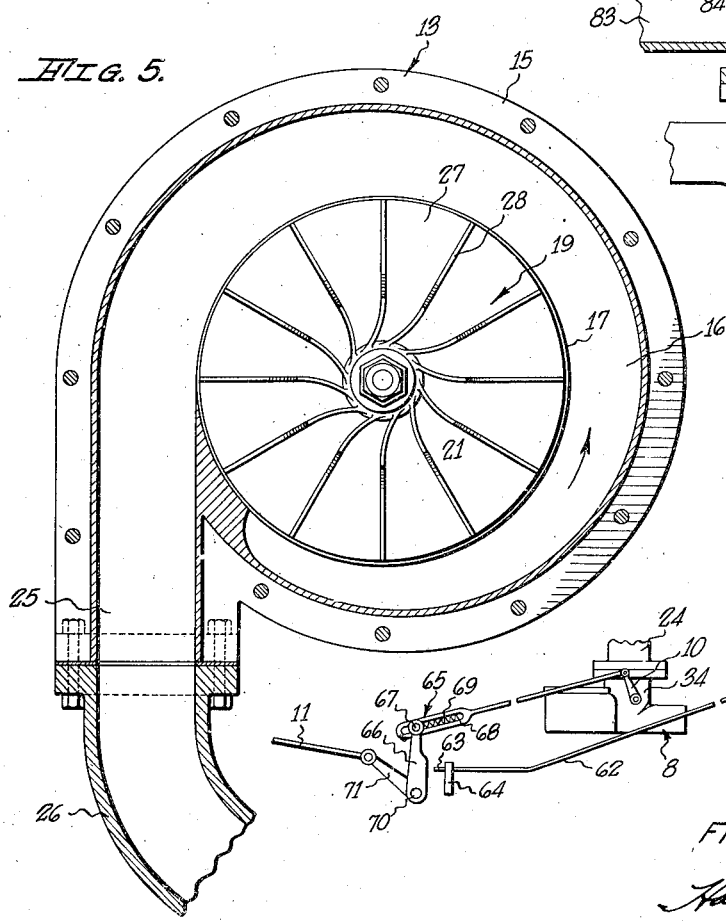
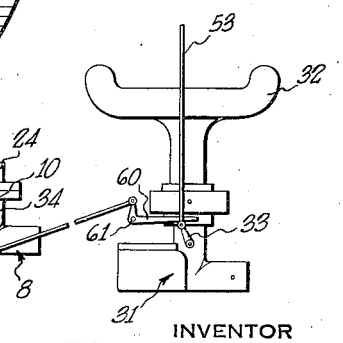
INVENTOR
FRANK R. ELLIOTT
BY
Harold W. Mattingly
ATTORNEY Patented July 11, 1939

2,165,360

UNITED STATES PATENT OFFICE 2,165,360

SUPERCHARGER SYSTEM FOR MOTOR VEHICLES

Frank R. Elliott, Los Angeles, Calif., assignor to Ethyl Gasoline Corporation, Detroit, Mich., a corporation of Delaware Application January 10, 1938, Serial No. 184,281

4 Claims. (Cl. 123—119)

My invention relates to motor vehicles and has particular reference to a supercharger system which may be employed in combination with the usual engine of the motor vehicle for the purpose of providing additional power when the vehicle is placed under increased load.

In the operation of heavy vehicles driven by internal combustion engines, such as buses, trucks and the like, it is desirable that the running time between any two terminal points be maintained at a minimum. Present vehicles of this character are designed with power plants adapted to maintain the vehicle in motion at a fair rate of speed during its passage over comparatively level stretches of roadway but such power plants are inadequate to maintain this reasonable rate of speed when hills, mountains or other grades are to be negotiated. For example, in the traversing of a predetermined distance through hilly country the operator of the vehicle is required to change gears, dropping back into a relatively low gear in order to negotiate the hills and grades encountered, appreciably reducing the traveling speed of the vehicle and entailing considerable loss of time as well as slowing down the passage of traffic over the highway.

It is therefore an object of my invention to provide a system for producing additional power from the usual engine or power plant of the vehicle when load conditions require an increase of power.

Another object of my invention is to provide an attachment which may be employed in combination with the usual engine or power plant of motor vehicles of the character described wherein a supercharger operated by a prime mover separate from the ordinary engine of the vehicle is employed to develop increased power from said ordinary engine.

Another object of my invention is to provide a supercharger for the ordinary engines of motor vehicles wherein the supercharger is operated by a separate prime mover, separately controlled and brought into action only when the necessity for employment of the same arises.

Another object of my invention is to provide a supercharger for the usual engines of motor vehicles in which an auxiliary engine is employed to drive the supercharger and in which the auxiliary engine is provided with controlling apparatus separate and independent of the controlling apparatus for the main engine.

Another object of my invention is to provide a supercharger system of the character set forth in the preceding paragraph wherein the auxiliary engine may be controlled in accordance with the load placed upon the main engine to maintain a substantially constant speed of the main engine under variations of loading thereof.

Another object of my invention is to provide a supercharger system of the character set forth in the preceding paragraphs wherein the throttle employed to control the operation of the main engine is also adapted to control the speed of the auxiliary or supercharger engine to assist in the maintaining of substantially constant speed of the main engine.

Another object of my invention is to provide a system of the character set forth in which the supercharger engine and supercharger are normally idle and are brought into action at the will of an operator.

Another object of my invention is to provide a system of the character set forth wherein the auxiliary engine for driving the supercharger is automatically throttled down upon decrease of load upon the main engine.

Other objects and advantages of my invention will be apparent from a study of the following specification, read in connection with the accompanying drawings, wherein Fig. 1 is a side elevational view of a power plant employed in a motor vehicle and illustrating the association with the usual engine of such vehicle, of a supercharger system construction in accordance with my invention;

Fig. 2 is a detail vertical sectional view taken through the carburetor for the auxiliary or supercharger engine illustrated in Fig. 1;

Fig. 3 is a detail vertical sectional view taken through a control device for the auxiliary engine shown in Fig. 1;

Fig. 4 is a detail sectional view taken through one form of supercharger which may be employed in the practice of my invention;

Fig. 5 is an end view of the supercharger shown in Fig. 4 with one of the housing plates removed;

Fig. 6 is a detail view of a modified form of connection which may be made between the carburetor of the main engine of the vehicle and the supercharger employed in the practice of my invention; and Fig. 7 is a detail diagrammatic view illustrating one form of control device which may be employed to control the speed of the auxiliary or supercharger engine.

Referring to the drawings, I have illustrated in Fig. 1 the adaptation of my supercharger system to the usual engine employed in trucks, buses or similar vehicle wherein an internal combustion engine 1 is located within an engine compartment 2 enclosed by a hood 3 in the ordinary manner.

It is the common practice of manufacturers of vehicles of this character to select an engine for driving the vehicle of suitable size and horse power to maintain the vehicle in operation at a reasonable speed when the vehicle fully loaded is traversing substantially level roadways but requiring change gear mechanism to be interposed between the engine and the wheels of the vehicle whenever substantial grades are encountered, requiring the operator of the vehicle to set the gears in "second" or "low" in order to negotiate such grades.

The engine 1 illustrated in Fig. 1 is presumed to have been selected for the particular vehicle with which it is associated in the common manner so that when grades are encountered by the vehicle it is ordinarily necessary to change gears in order to drive the vehicle over such grades.

The engine 1 is illustrated in its usual location and in its usual association with a water cooling radiator 4 from which water is circulated through suitable pipes 5 and 6. Such engine is ordinarily equipped also with a suitable starter 7 by which the engine may be started and with a carburetor 8 coupled to an intake manifold 9 for supplying a mixture of fuel and air to the engine, the quantity of which is controlled by a butterfly valve 10 under the control of an operator of the vehicle by the usual foot throttle mechanism 11 connected through links 12 so that by depressing or releasing the foot throttle 11 the speed of the engine and the power developed thereby may be controlled in the usual manner.

I provide a supercharger for such ordinary engine 1, the supercharger comprising a blower or air pump 13 which may be of any desired construction, one form of which is illustrated particularly in Figs. 4 and 5 as comprising a suitable housing constructed of a pair of complementary housing members 14 and 15 substantially circular in shape and providing an annular duct 16, the inner side 17 of which communicates with a fan chamber 18 in which rotates a fan or impeller 19. The impeller 19 is illustrated as being coupled to a drive shaft 20 as by means of suitable nuts 21 holding the impeller 19 upon the tapered end 22 of the shaft 20. The housing member 14 has a central opening or inlet passage 23 communicating with the fan chamber 8 substantially concentric with the axis of rotation of the shaft 20 and to which is coupled an inlet pipe 24 while the duct 16 extends about the periphery of the fan chamber 8 to receive air or gases blown by the fan 19, the duct 16 gradually increasing in cross sectional area in the direction of rotation of the impeller or fan 19 as it extends toward the tangentially disposed outlet 25, to which an outlet pipe 26 may be connected.

The impeller 19 preferably comprises a substantially disc-like member 27, from one face of which extends a plurality of blades 28, conforming in shape with the lateral cross section of the fan chamber 8, as illustrated particularly in Figs. 4 and 5.

The supercharger or blower 13 is arranged to be driven by means of an auxiliary engine 29 which may be mounted in any suitable location, preferably in the engine compartment 2 so that it, as well as the main engine 1, may be enclosed by the hood 3. The supercharger 13 may be mounted in any suitable manner with respect to its operating engine 29, one form of mounting being illustrated herein as comprising an extension 30 of the housing member 15 secured directly to the block of the engine 29, in which housing 30 suitable gears may be provided interconnecting the crank shaft of the auxiliary engine 29 with the drive shaft 20 for the impeller or fan 19 though it will be understood by those skilled in the art that belts and pulleys or any other suitable means may be employed to interconnect the crank shaft of the engine 29 and the drive shaft 20, the speed ratio for the two shafts being selected preferably to provide a relatively high speed of rotation of the shaft 20 for a given speed of rotation of the crank shaft of the auxiliary motor 29.

The auxiliary motor 29 is preferably a small internal combustion engine of merely sufficient horse power to readily operate the supercharger 13 to produce a predetermined air pressure in the outlet pipe 26 from the supercharger. The engine 29 is provided with its own separate starter 7a, permitting the engine 29 to be started at the will of the operator of the vehicle.

By referring particularly to Fig. 1, it will be noted that the carburetor 8 for the main engine 1 has its air outlet 34 coupled directly to the inlet pipe 24 for the supercharger so that even when the supercharger is idle the air and fuel from the carburetor 8 will pass through the supercharger 13 and the outlet pipe 26 to the intake manifold 9 of the main engine, it being understood that the shape of the impeller 19 and its housing 14—15 should be such as to provide adequate passage therethrough for all of the fuel normally required by the engine 9. Thus when the vehicle is operating over such character of roadway as may be adequately negotiated at a reasonable speed by merely employing the main engine 1 without the supercharger, the supercharger 13 may be idle, that is, its driving engine 29 may be stopped so that during such portions of the travel of the vehicle only the main engine 9 is operating, so that the employment of my supercharger and supercharger system does not interfere in any manner with the normal operation of the vehicle.

Now, however, when a grade is encountered which in the opinion of the operator of the vehicle cannot be successfully negotiated by use only of the main engine without changing of the gears or can be negotiated at a much reduced and uneconomical speed, but may at that time start the auxiliary engine 29 by actuating the starter 7a, placing this engine into operation to rotate the fan or impeller of the supercharger 13. The supercharger will therefore operate to increase the pressure and volume of air and fuel supplied to the main engine 1 which, as will be understood by those skilled in this art, will increase the horsepower production of the main engine and permit the vehicle to travel up such grades without reduction in speed and without the necessity of changing of gears.

By employing an auxiliary engine 29 for driving the supercharger only under such conditions as requires supercharging of the main engine, great economy of operation of the vehicle is accomplished while the cost of the fuel required to operate the auxiliary engine 29 is far outweighed by the economy accomplished by enabling the vehicle to traverse grades which heretofore required reduction in gearing and necessarily loss of speed and time. It will be noted that none of the power of the main engine is employed in driving the supercharger so that no additional load or drag is placed upon the main engine and the supercharger may be operated at any desired speed to produce the degree of supercharging required by the main engine independent of the speed of operation of the main engine.

The supercharger is preferably operated at such speed as will produce an intake manifold pressure of a predetermined value; for example, the operator in approaching a given grade in the roadway may determine that a predetermined number of pounds of supercharging will be required to adequately negotiate the grade. I provide a control device 35 by which the operator may select the number of pounds of supercharging produced by the supercharger 13, the control device 35 being illustrated particularly in Figs. 1 and 3 as including a cylinder 36 communicating with the interior of the intake manifold 9 for the main engine 1 as, for example, providing a threaded boss 37 adapted to be screwed into the manifold 9 and provided with a port or passage 38 communicating with the interior of the cylinder 36. A piston 39 is mounted for reciprocation within the cylinder 36 and is normally urged downwardly in the cylinder by means of a compression spring 40, one end of which bears upon a head 41 slidable longitudinally of the cylinder 36. The head 41 is coupled, as indicated at 42, to a bellcrank 43 which in turn is pivoted at 44 upon a stationary bracket 45 which may be formed upon or attached to the cylinder 36. The bellcrank 43 is coupled by means of a rod 46 to a handle 47 extending into the driver's compartment of the vehicle and preferably located upon the dash 48 thereof. Thus by moving the handle 47 to a selected position the operator may select the pressure exerted by the spring 40 upon the piston 39 to balance a corresponding pressure within the intake manifold 9.

The piston 39 is provided with a piston rod 49 which preferably extends upwardly through the head 41 to engage a lever 50 pivoted at 51 upon a second bracket 52 which, like the bracket 45, may be secured directly to the cylinder 36. The opposite end of the lever 50 is coupled by means of a link 53 to the throttle valve 33 of the carburetor 31 on the auxiliary engine 29. With a given setting of the handle 47 the pressure within the intake manifold 9 will be applied to the piston 39, any increase in pressure overcoming the compression of the spring 40 and moving the piston upwardly in its cylinder 36 and moving the butterfly valve 33 toward closed position as shown in Fig. 2, thus reducing the speed of the supercharger 13 until the pressure within the intake manifold 9 reaches the value for which the spring 40 has been set. Likewise any decrease in pressure within the intake manifold 9 will permit the piston 39 to move in the opposite direction or downwardly, opening the throttle valve 33 until the speed of the supercharger 13 reaches such value as will again produce the desired pressure in the intake manifold 9.

By employing this type of control the operator of the vehicle may at all times control the amount of supercharging, selecting just such supercharging as is adequate to allow the main engine 1 to drive the vehicle at a suitable speed over the grade.

Should the operator desire to stop the vehicle upon the grade or should the grade change such that the amount of supercharging for which the handle 47 has been set is more than is needed, the supercharger engine 29 should be slowed down to meet the new condition. For this purpose I have illustrated an auxiliary control for the supercharger engine 29 as comprising a second butterfly valve 54 for the carburetor 31 coupled as by means of a link 55 to a diaphragm 56 located within a diaphragm chamber 57. The chamber 57 is preferably open to the atmosphere on its left-hand side as viewed in Figs. 1 and 2 while the right-hand side of the chamber 57 communicates with the intake manifold 9 through a suitable pipe or tube 58. A spring 59 normally urges the diaphragm 56 toward the left as viewed in Fig. 2 so that when the main engine is throttled down the vacuum created in the intake manifold 9 of the main engine will draw the diaphragm toward the right as viewed in Fig. 2, operating the auxiliary butterfly valve 54 toward closed position, thus automatically throttling down the supercharger engine at such times as the supercharging at the higher pressures is not needed.

When the main engine is operating as a supercharged engine with the pressure control device 35 set for a predetermined pressure, it may occur that rapid acceleration of the main engine is desired for a short period of time as, for example, to permit the vehicle to pass another vehicle on the roadway. For this purpose it is desirable that some means be provided for speeding up the supercharger engine 29 at the same time that the main engine is desired to be speeded. For this purpose I have illustrated in Fig. 7 an additional control for the throttle 33 of the supercharger engine 29 as comprising a bellcrank lever 60 pivoted at 61 and having one of its arms arranged to bear upon the throttle valve lever for the throttle valve 33 in such manner that a link 62 coupled to the bellcrank 60, when moved forwardly, will act to open the throttle valve 33. The end 63 of the rod 62 is preferably guided through a suitable slide bearing 64 fixed to some stationary part of the vehicle in such manner that the end 63 of the rod will be disposed immediately adjacent some moving part of the linkage between the foot throttle control bar 11 and the butterfly valve 10 of the main carburetor 8. As is the usual practice, the linkage between the foot throttle bar or lever 11 and the butterfly valve 10 includes a lost motion connection 65 to adapt the throttle valve 10 to either hand or foot control, such as by providing a lever 66 having a pin 67 disposed within a slot 68 in the lost motion connection member 65, the pin 67 being normally urged rearwardly in the slot 67 by means of a spring 69. In the form of the device illustrated herein, the lever 66 is pivoted to some stationary part of the vehicle at 70 so that the foot throttle pushrod 11 may be connected thereto either directly as is illustrated in Fig. 1 or through a second lever 71 as indicated in Fig. 7. The lever 66 is disposed in such manner that its plane of movement is in line with the end 63 of the rod 62 and is spaced from the end 63 in such manner that during the normal operation of the foot throttle 11 the lever 66 will not contact the rod 63. However, when the foot throttle 11 is fully depressed, as will occur when the operator desires to rapidly speed up the vehicle, the rod 62 will be engaged by the lever 66 and will be moved forwardly, thus opening the throttle for the supercharger engine 29, increasing its speed to supply that additional supercharging required for the rapid acceleration of the main engine 1.

By referring particularly to Fig. 1, it will be noted that the employment of a supercharger driven by a small auxiliary internal combustion engine may be readily adapted to the chassis of the ordinary bus or truck without appreciable alteration thereof; the gasoline supply line 74 which supplies gasoline or other fuel to the main engine carburetor 8 may be extended as indicated at 75 to the carburetor 31 of the auxiliary engine 29 while connection of the auxiliary engine to the main engine cooling system may be readily made and the same battery which supplies the main engine may be employed to supply current for starting and ignition purposes for the auxiliary engine.

It will be noted therefore that during normal operations of the vehicle the main engine 1 operates exactly as though the supercharger were not present, the supercharger remaining dormant and consuming no power either in the form of fuel or power derived from the main engine 1, but as soon as the condition arises which makes supercharging either necessary or desirable, the supercharger may be started and brought into action, still consuming no power from the main engine and being capable of entirely separate and independent control to produce the degree of supercharging best adapted to fit the particular road condition and the particular load condition encountered, irrespective of the speed at which the main engine is operating.

While satisfactory results can be obtained by employing the main engine carburetor 8 disposed at the entrance of the supercharger 13, it may be found desirable to provide one carburetor connected directly to the intake manifold 9 of the main engine and an additional carburetor connected to the inlet of the supercharger 13 so that under normal operating conditions of the engine 1, it will draw its fuel and air through the carburetor directly attached to the intake manifold while when the supercharger is in use this first carburetor may be bypassed and all of the fuel and air supplied to the main engine may be drawn through the second carburetor.

In Fig. 6 I have illustrated an arrangement of this character including a carburetor 80 which for purposes of illustration may be considered as a down-draft carburetor connected to the intake manifold 9 of the main engine through a coupling member 81, the coupling member 81 constituting in effect a T having an air and fuel passage 82 therethrough through which air and fuel from the carburetor 80 may pass directly into the intake manifold 9 while a second air and fuel passage 83 communicates with the outlet of the supercharger 13, substituting for the outlet pipe 26. A flap valve 84 is preferably provided in the coupling member 82 and arranged to be moved between the full line position shown in Fig. 6 to the dotted line position shown in Fig. 6, to alternately cut off communication with either of the air passages 82 and 83. A suitable control lever 85 may be provided on the flap valve 84, controlled by means of a link or pushrod 86 to permit manual setting of the flap valve 84 to the full line position shown in Fig. 6 when the supercharger is not in use, providing a direct air and fuel passage from the carburetor 80 to the inlet manifold 9. When the valve 84 is in the position shown in dotted lines in Fig. 6, the air passage through the carburetor 80 is closed off and all of the air and fuel supplied to the intake manifold 9 will be drawn through the supercharger at such times as the supercharger is in operation.

It will therefore be observed that I have provided a system by which the ordinary road vehicle with its ordinary engine may be readily adapted for use as a supercharged engine only at such times as additional power is desirable, permitting maximum economy of operation of the vehicle during the major portion of its travel but permitting the supplying of additional power by the main engine whenever such additional power is required.

While I have illustrated my supercharger 13 as being driven by a small auxiliary engine placed at one side of the main engine of the vehicle, it will be understood by those skilled in the art that the auxiliary engine may be mounted in longitudinal alignment with the main engine 1 or disposed in any other suitable location, preferably close to the main engine or, if desired, the auxiliary engine 29 may be constructed integrally with the main engine 1 but operable and controllable separately from the main engine.

While I have shown and described the preferred embodiment of my invention, I do not desire to be limited to any of the details of construction shown or described herein, except as defined in the appended claims.

I claim:

1. The combination of a main internal combustion engine of the Otto cycle type; a supercharger for said main engine, an auxiliary internal combustion engine operatively connected to drive said supercharger, and a control device for said auxiliary engine comprising a movable member connected to the throttle valve of the auxiliary engine and operatively connected to the intake manifold of the main engine to respond to the varying pressures therein and manual control means acting on said member for presetting the latter whereby response of the member to the intake manifold pressure varies the operation of the auxiliary engine to maintain a substantially constant supercharger output pressure.

2. The combination of a main internal combustion engine of the Otto cycle type; a supercharger for said main engine, an auxiliary internal combustion engine operatively connected to drive said supercharger, and adjustable means for controlling the power output of the auxiliary engine and for automatically maintaining the pressure supplied by said supercharger substantially at a selected value, a manual control for the main engine, and a separate control for the auxiliary engine connected by a lost motion connection to the manual control for the main engine.

3. The combination of a main internal combustion engine of the Otto cycle type; a supercharger for said main engine, an auxiliary internal combustion engine operatively connected to drive said supercharger, and adjustable means for controlling the power output of the auxiliary engine and for maintaining the pressure supplied by said supercharger substantially at a selected value, and a secondary control for said auxiliary engine comprising a member operatively connected to the intake manifold of the main engine and responsive to varying pressure in said manifold, and a control valve for said auxiliary engine operatively connected to said member.

4. The combination of a main internal combustion engine of the Otto cycle type; a supercharger for said main engine, an auxiliary internal combustion engine operatively connected to drive said supercharger, and adjustable means for controlling the power output of the auxiliary engine and for automatically maintaining the pressure supplied by said supercharger substantially at a selected value, a secondary control for said auxiliary engine comprising a member operatively connected to the intake manifold and responsive to varying pressure in said manifold, and a control valve for said auxiliary engine operatively connected to said member, and manually operable means for increasing the power output of the auxiliary engine.

FRANK R. ELLIOTT.